United States Patent

[11] 3,612,978

| [72] | Inventor | Kazumasa Mori<br>Kariya, Japan |
|---|---|---|
| [21] | Appl. No. | 63,223 |
| [22] | Filed | Aug. 12, 1970 |
| [45] | Patented | Oct. 12, 1971 |
| [73] | Assignee | Nippondenso Kabushiki Kaisha<br>Kariya-shi, Japan |
| [32] | Priority | Aug. 23, 1969 |
| [33] | | Japan |
| [31] | | 44/66,599 |

[54] BATTERY CHARGE INDICATION MEANS
3 Claims, 5 Drawing Figs.

[52] U.S. Cl. .................................................. 320/48,
322/99, 340/249
[51] Int. Cl. .................................................. H02j 7/00
[50] Field of Search .................................... 320/38, 39,
48, 57, 59, 61; 322/99; 324/29.5; 340/249

[56] References Cited
UNITED STATES PATENTS

| 3,418,553 | 12/1968 | Potter................... | 320/57 X |
| 3,479,575 | 11/1969 | Wright et al............ | 320/48 |
| 3,559,026 | 1/1971 | Nolan et al............. | 320/61 X |

*Primary Examiner*—William M. Shoop, Jr.
*Attorney*—Cushman, Darby & Cushman

ABSTRACT: A battery charge indication means, whose input is the half-wave rectification of a single-phase voltage from an alternator of a battery charger, and in which the positive and negative portions of the single-phase half-wave-rectified voltage are alternately impressed on two transistors to maintain one of the transistors "off" during the charge of a battery, its circuit components including diodes and resistors as well as the aforementioned two transistors, so that it is free from a capacitive component, which would give rise to various problems.

BATTERY CHARGE INDICATION MEANS

BACKGROUND OF THE INVENTION

Field of the Invention

This invention relates to a battery charge indication means and, more particularly, to a charge indication means in battery chargers having an AC generator as the charging source and supplying the output of the AC generator to a car battery through a voltage regulator, wherein whether the battery is being charged or not, is indicated by means of a lamp.

DESCRIPTION OF THE PRIOR ART

Figure 1:
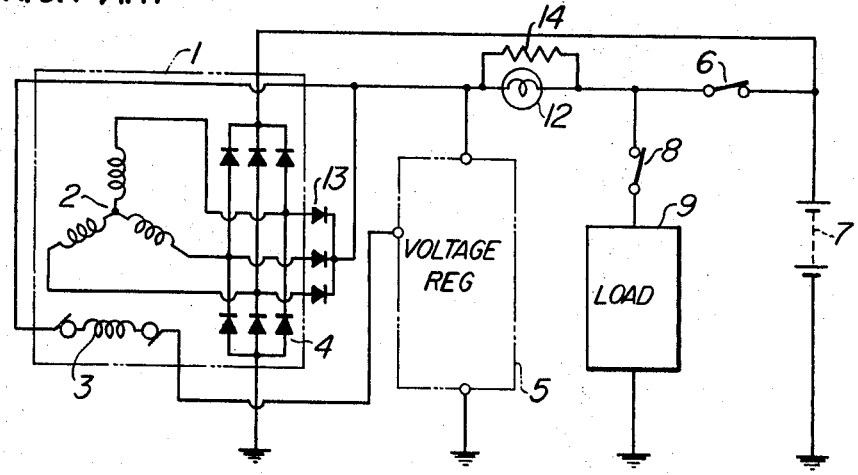
FIGS. 1 and 2 are circuit diagrams, partly in block form, showing examples of the charging apparatus having a charge indication means.
Figure 2:
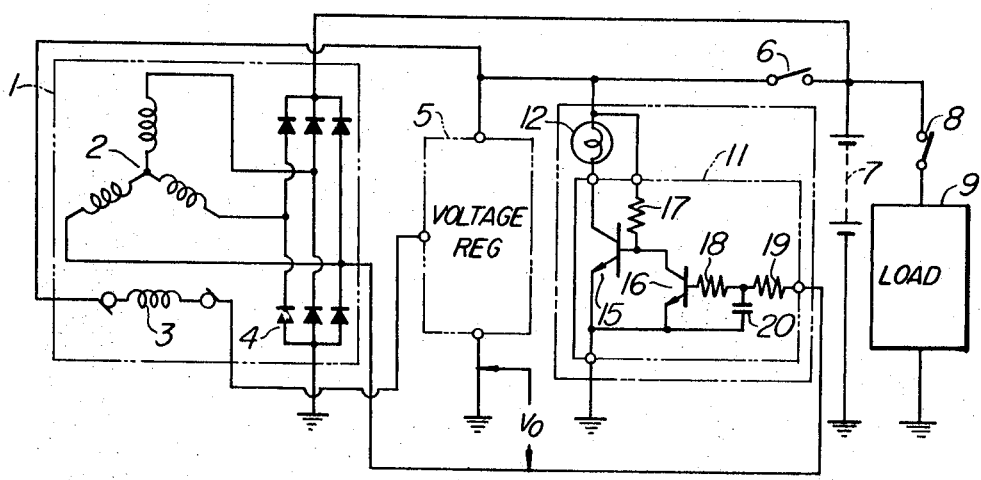

The prior art charge indication means, to which the invention pertains, is of the construction as typically shown in FIGS. 1 and 2. In the circuit of FIG. 1, the three output terminals of a three-phase AC generator 1 are connected through a set of diodes 13 to a field winding 3 and to a voltage regulator 5. They are also connected through a charge indication lamp 12 to a battery 7. With this construction, when the voltage of the generator 1 builds up to start the charging of the battery 7, the lamp 12 is turned off to indicate that the battery is being charged. If a malfunction occurs in the generator 1 during the charging of the battery 7, the lamp 12 is turned on.

With this arrangement, however, the charge indication lamp 12 has a large resistance, so that a resistor having a large capacity (with ratings of several 10 ohms and 5 watts for the 12-volt series) should be connected in parallel with the lamp 12 from the standpoint of the building up of the generator 1. Such high resistance gives rise to the problems of heat radiation and installation. Also, the connection of the AC generator is quite complicated, involving leads branching from the respective generator terminals for the connection of the diodes 13, so that the antivibration characteristic and reliability are impaired. Further, expensive power diodes are required for the three diodes 13 to allow exciting current to flow.

The arrangement shown in FIG. 2 includes a switching circuit 11, to which is fed an input voltage produced by the single-phase half-wave rectification of the output of a full-wave rectification type three-phase AC generator 1, and which comprises alternately triggered two transistors 15 and 16, resistors 17, 18 and 19 and a capacitor 20. The switching circuit 11 functions to turn off a charge indication lamp 12 only when the output voltage of the generator 1 is higher than the terminal voltage of the battery 7 and turns on the charge indication lamp 12 when this condition is upset (as when a fault occurs in the generator 1 during charging of the battery 7). This charge indication means is free from the above problems in the arrangement of FIG. 1. However, this charge indication means requires a smoothing circuit consisting of capacitor 20 and resistor 19 to smooth the half-wave rectified voltage for impression on the base of the prestage transistor 16. Besides, the capacitor 20 should have a large capacitance of over several 10 microfarads. Therefore, the charge indication means is not only unable to be fabricated in an integrated circuit, but also it is subject to temperature limitation in its use. Also, as the smoothing circuit is used, the internal impedance of the switching circuit itself is high, so that the switching circuit tends to malfunction due to even a leakage current form the battery through a leakage path of the diodes in the generator circuit.

SUMMARY OF THE INVENTION

An object of the invention is to provide a charge indication means comprising a first transistor having its collector connected to a charge indication lamp and its base connected through a diode to an input terminal and a base of a second transistor controlling the first transistor, wherein upon building up of the voltage of an AC generator to start the charge of a battery, the single-phase half-wave-rectified voltage of the AC generator is fed to the aforesaid input terminal to cut off the first transistor so as to turn off the charge indication lamp and the positive and negative portions of said single-phase half-wave-rectified voltage are alternately impressed on the first and second transistors to maintain the first transistor "off" during charging of the battery.

According to the invention, the half-wave-rectified voltage may be directly utilized without requiring any smoothing capacitor, which might give rise to various problems as in the prior art charge indication means, and the circuit may be composed only of semiconductor elements and resistive elements which are suitable for fabrication in integrated circuit. Also, as the single-phase half-wave-rectified voltage is utilized, only one live terminal of the AC generator may be connected to the charge indication means, thus extremely simplifying the circuit connection of the AC generator. Further, by the integration of the charge indication relay circuit the size and weight of the overall charge indication means may be extremely reduced to present a battery charger which has an AC generator containing a built-in charge indication means. Thus, the charge indication means according to the invention may feature smallness in size eliminating the space problem in its installation, lightness in weight, low cost and excellent performance.

These and other objects and features of the invention will become more apparent from the following detailed description of preferred embodiments of the invention with reference to the accompanying drawing.

DETAILED DESCRIPTION OF THE PREFERRED EMBODIMENTS

Figure 4:
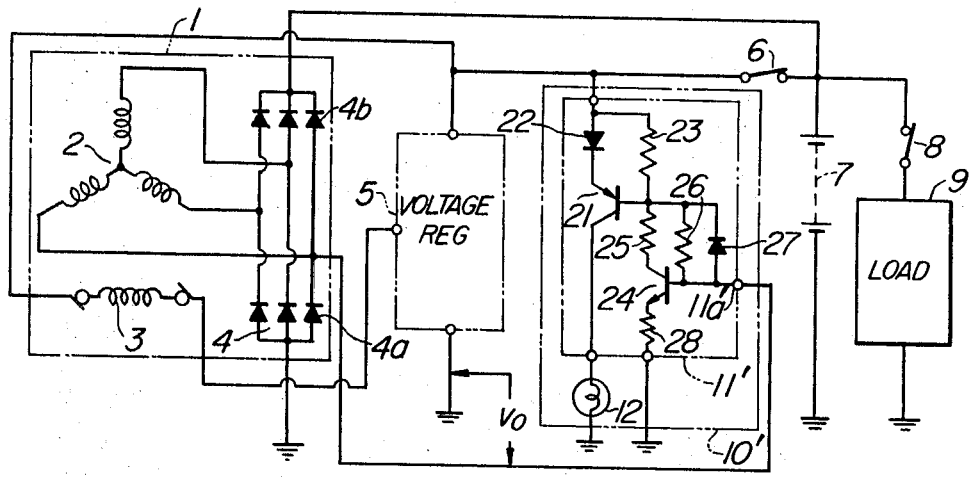
FIGS. 4 and 5 are circuit diagrams, partly in block form, showing embodiments of the charging indication means according to the invention. Throughout the drawing, similar reference symbols designate the same or equivalent parts.

FIG. 4 shows an embodiment of the invention. In the Figure, numeral 1 generally designates a full-wave-rectified three-phase AC generator including armature windings 2, a field winding 3 and a full-wave rectifier 4 having three pairs of diodes, each pair consisting of two diodes 4a and 4b having respective poles of opposite polarities connected to a corresponding live terminal. Numeral 5 designates a voltage regulator to regulate the output voltage of the AC generator 1 by controlling the current through the filed winding 3. It is usually an integrated circuit. Numeral 6 designates a key switch, numeral 7 a battery mounted on a vehicle, numeral 8 a load switch, and numeral 9 a reference vehicle load such as a headlight. Numeral 10 designates a charge indication means according to the invention. It comprises a charge indication relaY circuit 11' and a charge indication lamp 12. The charge indication relay circuit 11' comprises a PNP transistor 21 to control the energization of the lamp 12, a bias diode 22 connected to the emitter of the transistor 21, a resistor 23 to bias and protect the transistor 21, an NPN transistor 24 to control the base current to the transistor 21, a resistor 25 to restrict the collector current in the transistor 24, a resistor 26 connected to the base of the transistor 24, a diode 27 to provide only positive input voltage on the base of the transistor 21, and a resistor 28 to protect the transistor 24 from the output voltage of the generator 1. The series circuit consisting of the charge indication lamp 12, transistor 21 and bias diode 22 is connected in parallel with the battery 7 through a switch 6. The charge indication relay circuit 11' has its input terminal 11'a connected through lead 29 to one live terminal of the generator 1.

In the operation of the above construction, when the key switch 6 is closed, the voltage of the battery 7 is impressed through the switch 6 on the charge indication relay circuit 11'.

Figure 3:
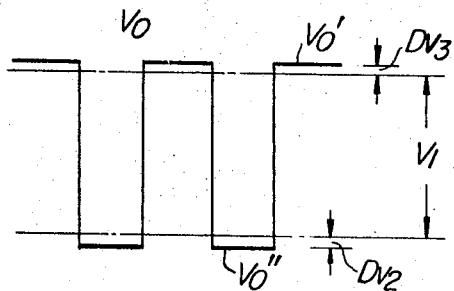
FIG. 3 shows the waveform of a voltage produced by the single-phase half-wave rectification of the output of an alternator as the charging source.

This voltage causes current to pass through the base circuit of the transistor 21, that is, the circuit including the resistors 23 and 26, transistor 24 and resistor 28, thus causing current from the battery 7, through the switch 6, diode 22, emitter-collector path of the transistor 21, charge indication lamp 12 to ground, so that the lamp 12 is turned on. Upon the closure of the key switch 6 exciting current is also caused to flow from the battery 7 through the switch 6 into the field winding 3 of the generator 1. Thus, the generator 1 is driven by the battery 7. The "on" state of the lamp 12 thus indicates that the battery 7 is being discharged. As the r.p.m. of the generator 1 is increased, when the generator 1 is driven by an engine not shown (mounted on the vehicle), the output voltage of the generator 1 exceeds the voltage of the battery 7, at which time the battery 7 begins to be charged. When this situation is set in, the single-phase half-wave-rectified voltage of the generator 1, that is, the voltage $V_0$ between lead 29 and earth, whose waveform is shown in FIG. 3, is impressed on the input terminal 11'a of the relay circuit 11'. In FIG. 3, $V_1$ represents the voltage across the battery 7, $D_{v2}$ the voltage drop across the diode 4a, and $D_{v3}$ the voltage drop across the diode 4b. If the hill or positive portion of the single-phase half-wave-rectified voltage, as indicated at $V'_0$ appears at the input terminal 11'a of the relay circuit 11', it is impressed through the diode 27 on the base of the transistor 21 to render the potential of the base of the transistor 21 to render the potential of the base of the transistor 21 higher with respect to the emitter thereof, thus cutting off the transistor 21. On the other hand, if the valley or negative portion of the single-phase half-wave-rectified voltage $V_0$, as indicated at $V''_0$, appears at the input terminal 11'a, the potential of the base of the transistor 24 is rendered lower with respect to the emitter thereof to cut off the transistor 24. This means that the base circuit of the transistor 21 if cut off, so that the transistor 21 is also "off." Although the resistor 26 also constitutes the base circuit of the transistor 21, its resistance is set to be so high as to hold the transistor 21 "off," so that the transistor 21 remains "off."

As is described, the transistor 21 is cut off as soon as the battery 7 begins to be charged by the rising of the generator 1 to turn off the lamp 12, and during the charging of the battery 7 the transistor 21 and hence the lamp 12, is maintained "off."

Figure 5:
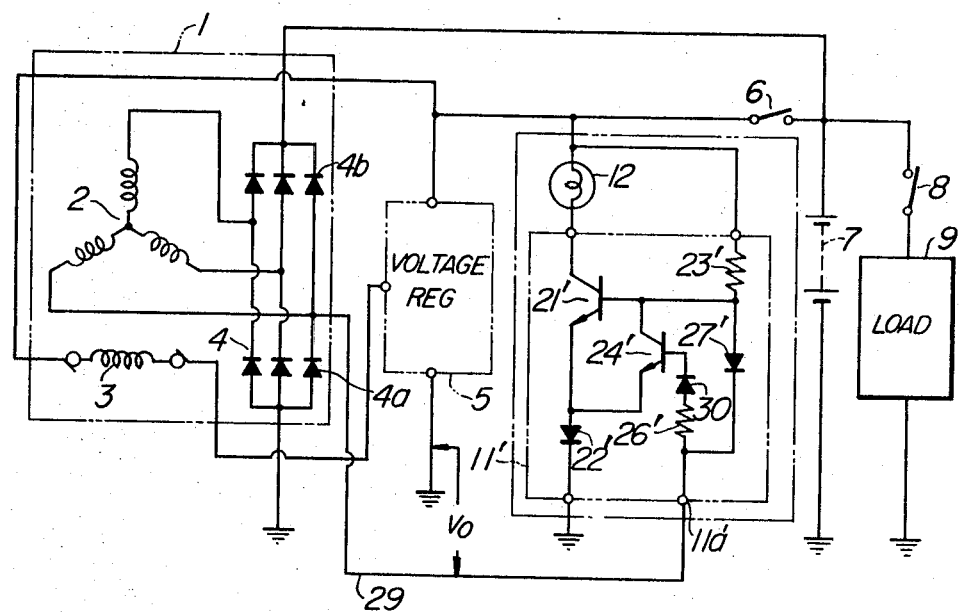

FIG. 5 shows another embodiment of the invention. In this embodiment NPN transistors are used for both the transistors, namely transistors 21' and 24'. In the Figure, the parts corresponding to those in the embodiment of FIG. 4 are designated by like reference numerals, but with prime marks.

In the operation of this embodiment, when the key switch 6 is closed, causing exciting current to flow through the field winding 3 of the generator 1, current is also caused to pass from the battery 7 through the switch 6, resistor 23', base-emitter path of the transistor 21', diode 22' to ground, thus triggering the transistor 21' to turn on the charge indication lamp 12.

Subsequently, when the charging of the battery begins with the rising of the generator 1, between the lead 29 and earth there appears the voltage $V_0$ of the waveform as shown in FIG. 3, which is impressed on the input terminal 11'a of the relay circuit 11'. If the hill portion $V''_0$ of the voltage $V_0$ appears at the input terminal 11'a, current is caused through the resistor 23' and diode 27' to the input terminal 11'a. This is because the lead 29 is at a potential lower than the earth potential by an amount equal to the voltage drop $D_{v2}$ (about 1 volt) across the diode 4a, so that the base potential of the transistor 21' is reduced substantially to the earth potential, thus cutting off the transistor 21'. Then, when the portion $V'_0$ of the voltage $V_0$ appears at the input terminal 11'a, current is this time caused to pass through the resistor 26', diode 30, base-emitter path of the transistor 24' to ground to trigger the transistor 24', so that the transistor 21 is "off."

In the above manner, as soon as the battery 7 begins to be charged with the rising of the generator 1, the transistor 21 is cut off to turn off the charge indication lamp 12, and during the charging of the battery 7 the transistor 21, and hence the lamp 12, is maintained "off." It is to be noted that upon closure of the key switch 6 the transistor 24' is not triggered, because the conduction state of the transistor 24' in the nonsaturated region is brought about by the diodes 27' and 30 and resistor 26'. Thus, the conduction state of the transistor 24' in the saturated region is brought about only when the voltage $V'_0$ appears at the input terminal 11'a.

In the preceding charge indication means of FIGS. 4 and 5 according to the invention, if the input signal at the input terminal 11'a of the relay circuit 11' disappears due to an accident within the generator 1 or breaking of the lead 29, the charge indication lamp 12 is turned on. Thus, the accident may be detected from the lighting of the lamp 12.

Excellent performance of the embodiment of FIG. 4 is obtained by using a PNP transistor with a current rating of 500 milliamperes as the transistor 21, an NPN transistor with a current rating of 100 milliamperes as the transistor 24, diodes with current ratings of 500 milliamperes as the diodes 22 and 27 and resistors respectively with resistances of 160 ohms, 15 kiloohms, 47 kiloohms, and 470 kiloohms as the respective resistors 23, 25, 26 and 28. With these numerical specifications the charge indication lamp 12 is turned off as soon as 800 r.p.m. of the rising generator 1 is reached. In the embodiment of FIG. 5, excellent results are also obtained by using NPN transistors respectively with current rating of 500 milliamperes and 100 milliamperes as the respective transistors 21' and 24', diodes respectively with current rating of 500 milliamperes, 500 milliamperes and 100 milliamperes as the respective diodes 22', 30 and 27' and resistors respectively with resistance of 3.3 kiloohms and 470 ohms.

What we claim is:

1. A charge indication means for use in a battery charger including an AC generator and a full-wave-rectifier circuit which rectified the output of said AC generator for supplying DC power to the battery, comprising an input terminal connected with a terminal of one phase winding of said generator; a source terminal connected with a terminal of the battery; a charge indication lamp; a first transistor to control current flow to said lamp from said source terminal; and a second transistor for controlling said first transistor; said first transistor being directly cut off by one level of the AC voltage impressed to said input terminal, and being cut off through the function of said second transistor by the opposite level of said AC voltage impressed to said input terminal.

2. A charge indication means according to claim 1 wherein said first transistor is a PNP type, the base of which is connected through a diode to said input terminal and said second transistor is an NPN type, the base of which is connected to said input terminal.

3. A charge indication means according to claim 1 wherein said first transistor is an NPN type, the base of which is connected through a diode to said input terminal and said second transistor is an NPN type, the base of which is connected through a diode and a resistor to said input terminal.